G. G. FLOYD.
BRAKE HEAD.
APPLICATION FILED OCT. 25, 1915.
1,169,787.
Patented Feb. 1, 1916.
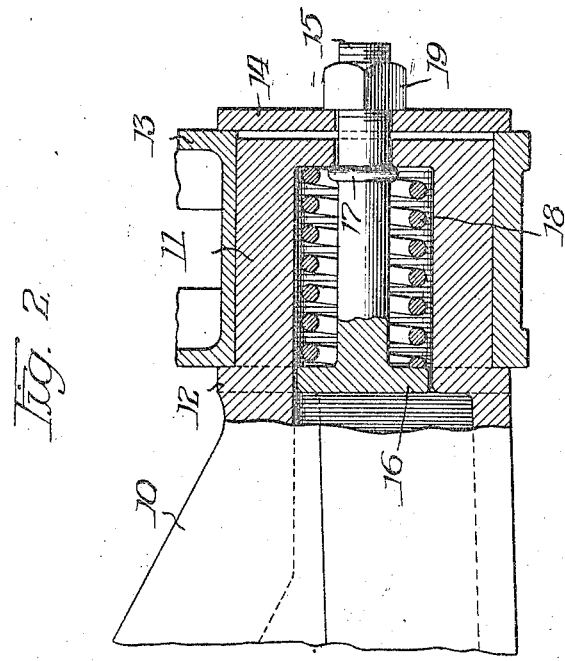
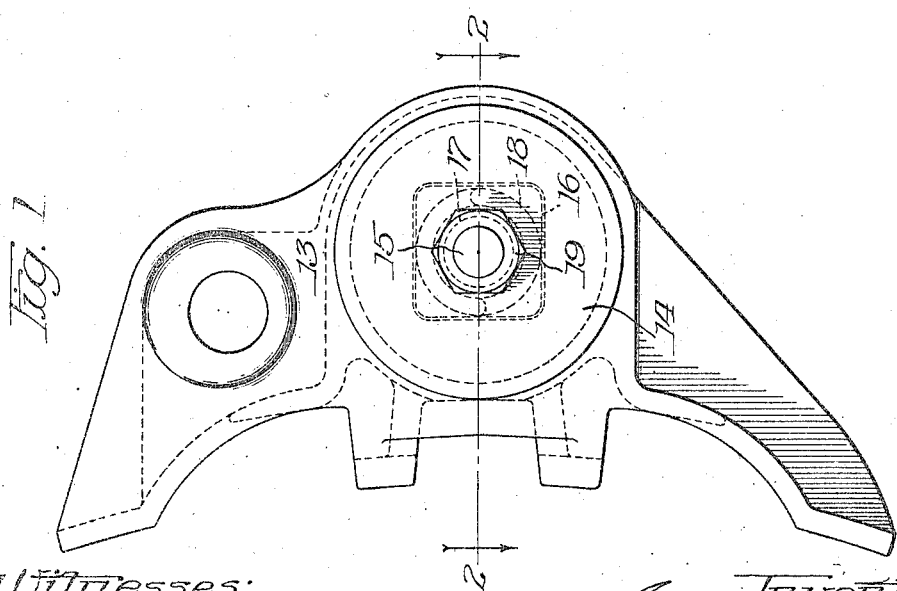
Witnesses:
Geo. C. Davison
C. J. Morrow
Inventor
George G. Floyd
by C. C. Hutherine
Atty.

UNITED STATES PATENT OFFICE.

GEORGE G. FLOYD, OF CHICAGO, ILLINOIS, ASSIGNOR TO AMERICAN STEEL FOUNDRIES, OF NEW YORK, N. Y., A CORPORATION OF NEW JERSEY.

BRAKE-HEAD.

1,169,787.  Specification of Letters Patent.  Patented Feb. 1, 1916.

Application filed October 25, 1915. Serial No. 57,677.

*To all whom it may concern:*

Be it known that I, GEORGE G. FLOYD, a citizen of the United States, and resident of Chicago, in the county of Cook and State of Illinois, have invented certain new and useful Improvements in Brake-Heads, of which the following is a specification.

My invention relates to railway brakes and has particular reference to a novel adjustable brake head.

As is well known, it is common to employ means in connection with the brake beams for adjustably securing the brake heads on the ends of the beam. Such devices have assumed a great variety of forms, some or all of which are subject to objection.

An object in the present construction is to provide an adjustable head, particularly adapted for use in connection with cast brake beams, which shall be at once simple, economical and easy of application and removal.

Difficulty has been experienced in securing these brake heads in angularly adjusted position by rigid means, no means having been found which is not subject to wear, due to the great vibration present in such devices. Furthermore, it will be understood that as the wheels to which the brakes are applied become worn the angular adjustment of the brake heads must change to conform to the smaller diameters of the wheels. I have conceived, therefore, that the theoretically desirable form of brake head adjusting means is one which shall be resilient and permit the angular movement of the head as required by the changes in diameter of the wheel or location of the brake beam.

The present device is of extremely simple form and combines the advantages of a rigid holding device and a resilient holding device.

The invention will be more readily understood by reference to the accompanying drawings, wherein—

Figure 1 is a side elevation of a brake head constructed in accordance with my invention, and Fig. 2 is a sectional view on the line 2—2 of Fig. 1.

Referring more particularly to the drawings, it will be seen that I have shown my invention as associated with a cast brake beam 10, on the ends of which is provided an integral sleeve 11, an integral flange 12 separating the sleeve from the beam. The brake head 13 is rotatably mounted on the sleeve and abuts against the annular flange 12. The head is held in place by means of an annular plate 14, which lies against the head, the plate being centrally apertured to accommodate a fastening bolt 15. This bolt is provided at its inner end with a round head 16, and at a point intermediate its end with a flange 17. Within the hollow axial portion of the sleeve 11 is mounted a coil spring 18, one end of the spring lying against the head 16 of the bolt, the other end abutting against the outer wall of the sleeve portion 11. It will be noted that the annular flange 17 on the bolt is of a size greater than the size of the aperture through the end wall, and that when the nut 19 on the bolt is drawn up, the plate 14 is forced against the head and the parts are rigidly held, the spring having no function in connection therewith. However, as wear takes place and the rigid engagement is reduced in holding capacity the spring 18 comes into action and holds the parts the same as any resiliently held brake head. It will be seen, therefore, that I have provided for a combined rigid and resilient holding action, the resilient action only being secured when the rigid holding device has failed.

The construction shown is capable of considerable modification, and such modifications as are within the scope of my claims I consider within the spirit of my invention.

I claim:

1. In a brake beam, the combination of a hollow sleeve secured to the end of a beam, a head rotatably mounted on said sleeve, a locking device located exteriorly of the sleeve and bearing against said head, a bolt axially mounted with relation to said sleeve and bearing against said locking device, and means coöperating with said bolt for securing a resilient holding action following a rigid holding action, substantially as described.

2. In a brake beam, the combination of a sleeve, a head rotatably mounted thereon, a locking device located exteriorly of said sleeve, an axial bolt engaging said locking device, a spring in the axis of said sleeve and acting upon said bolt, a stop on said bolt, the arrangement being such that said bolt acts on said locking device to rigidly hold the same until wear takes place, when said spring comes into action and resiliently acts upon said locking device, substantially as described.

3. In a brake beam, the combination of a hollow sleeve, a brake head rotatably mounted thereon, an exterior locking plate, a bolt extending through the hollow interior of said sleeve and acting upon said locking plate, and a spring mounted in the axis of said sleeve and acting upon said bolt, whereby said locking device is resiliently held against said head, substantially as described.

4. In a brake beam, the combination of a hollow sleeve, a brake head rotatably mounted on said sleeve, an annular plate located at the end of said sleeve and bearing at its periphery on said brake head, a spring mounted in the hollow interior of said sleeve, and an axial bolt engaging said spring and said annular plate, whereby said plate is resiliently held against the brake head, substantially as described.

5. In a device of the class described, the combination of a brake beam having an integral hollow sleeve, a brake head on the sleeve, an annular plate mounted at the end of said sleeve and bearing at its periphery on said head, a bolt acting on said annular plate, said bolt being provided with a round head and with an intermediate stop, and a spring mounted in the axis of said sleeve and bearing at one end against said round head of the bolt, the arrangement being such that said plate is rigidly clamped against said head and resiliently held when said rigid holding means have become worn, substantially as described.

Signed at Chicago, Illinois, this 20th day of October, A. D. 1915.

GEORGE G. FLOYD.

Witnesses:
J. F. LYNN,
CHAS. GARDNER.